(12) United States Patent
O'Neill et al.

(10) Patent No.: US 8,095,107 B2
(45) Date of Patent: Jan. 10, 2012

(54) VOICE MESSAGING PRIORITIZATION

(75) Inventors: Kenneth R. O'Neill, Woodinville, WA (US); Michael P. Snow, Langley, WA (US); Brad W. Offer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1049 days.

(21) Appl. No.: 11/614,373

(22) Filed: Dec. 21, 2006

(65) Prior Publication Data

US 2008/0153529 A1 Jun. 26, 2008

(51) Int. Cl.
*H04M 11/04* (2006.01)
*H04L 9/32* (2006.01)
(52) U.S. Cl. ..................... 455/404.1; 713/176
(58) Field of Classification Search ............... 455/404.1; 713/176
See application file for complete search history.

(56) References Cited

U.S. PATENT DOCUMENTS

| | | | | |
|---|---|---|---|---|
| 4,788,543 A | * | 11/1988 | Rubin | 340/7.21 |
| 5,463,676 A | * | 10/1995 | Ohsawa | 379/88.11 |
| 6,462,697 B1 | * | 10/2002 | Klamer et al. | 342/36 |
| 7,530,102 B2 | * | 5/2009 | Moskowitz | 726/13 |
| 2002/0138587 A1 | * | 9/2002 | Koehler et al. | 709/207 |
| 2003/0098773 A1 | * | 5/2003 | Chakravarty et al. | 340/3.1 |
| 2005/0091367 A1 | * | 4/2005 | Pyhalammi et al. | 709/224 |
| 2007/0140443 A1 | * | 6/2007 | Woodring | 379/88.06 |
| 2007/0180042 A1 | * | 8/2007 | Benco et al. | 709/207 |

* cited by examiner

*Primary Examiner* — Marisol Figueroa
(74) *Attorney, Agent, or Firm* — Caven & Aghevli LLC

(57) ABSTRACT

A voice radio communication system prioritizes radio voice communications so that higher priority voice transmission is given precedence. The communication system comprises a transmitter that inserts a digital watermark into a voice communication. Software in a receiver decodes the digital watermark to determine a priority requested by the sender, and other information about the sender and the message. The software determines the message priority based on multiple factors. Voice transmissions are digitally recorded and played in order of priority. Options exist for the user to control the playback.

15 Claims, 3 Drawing Sheets

FIG. 1 Sender Apparatus

FIG. 2 Recipient Apparatus

VOICE MESSAGING PRIORITIZATION

GOVERNMENT RIGHTS

The invention was made with Government support under contract no. NBCHC030031 awarded by the DARPA. The Government has certain rights to this invention.

TECHNICAL FIELD

This disclosure relates to communications. More particularly, this disclosure relates to prioritized voice radio communications.

BACKGROUND

Voice radio transmissions do not always reach the intended recipient. Voice messages may not reach a recipient for a number of reasons. Messages can interfere with one another when two different senders desire to speak to a recipient simultaneously. While modern radio communication systems allow multiple transmissions in parallel, receipt and listening are serial processes because a human can listen to only one message at a time. One message therefore gets stepped on; that is, transmission may occur, but receipt does not.

Consequences can be severe if an emergency message is stepped on in this manner. The sender might repeat the message until it is received, but in an emergency any delay is undesirable and might be critical. Also, if the sender is experiencing the emergency, it might not be possible to repeat the message and needed assistance would not be rendered.

Stepped-on messages that do not pertain to emergencies may nonetheless have a high priority. For example, a military commander may need to redirect a subordinate unit's movement at the same time a sub unit commander is communicating now-obsolete movement orders to his troops. The higher level commander should have priority, but his messages may be stepped on by lower level communications.

Miscommunication due to voice radio communications being stepped on has not been identified as a historical source of fatalities in commercial aviation. However, it is commonly cited in safety-related aviation incidents (e.g., NASA's Aviation Safety Reporting System) as a reason for missed or confused clearances (or clearance readbacks) and resulting mistakes (e.g., missed heading changes and altitude busts). This is especially true for surface operations at busy airports, particularly when the part of the voice message stepped on is the aircraft call sign.

If the recipient is busy when a message comes in, he or she may not be able to attend to it at once. In a single pilot aircraft, for example, the recipient has numerous other tasks in addition to communication. Existing systems require the recipient to remember the sender's identity and to issue a request to "Say again" later on, which adds a memory task at a time when workload is already high. The added memory task may slow or otherwise degrade performance of more important tasks, or the recipient may forget that a message came in and the communication may never be completed.

During periods of very high workload the recipient may experience attention tunneling (intense focus on one task to the exclusion of others). In this situation the recipient may entirely fail to notice that a message has arrived.

There have been a number of attempts to solve the problems mentioned above. Military personnel, commercial pilots, air traffic controllers, and other radio operators are trained to use specialized language and procedures to maximize communication and minimize interference. Basic notification of specific emergencies can often be sent using other systems besides voice radio, such as special transponder codes, marine emergency beacons or signal flares. Implementation of these solutions requires training of the users of these systems, but training costs both time and money. Training can be imperfect, either because the syllabus is imperfectly designed or because it was improperly applied. Trained-on procedures may be forgotten in emergency situations, especially if such situations are rare (e.g. commercial airline operations). Although training seeks to optimize the use of inherent human resources, it does not increase the amount of a resource (for example, memory of past transmissions) available. Finally, the problems cited above occur today despite training aimed at minimizing them.

Transponders communicate the fact and sometimes the type of an emergency (e.g., 7500 for hijack, 7600 for lost communications) but not its specific nature or details. Similarly, emergency beacons are often limited to transmitting a specific block of information. In contrast, voice radio can transmit any information that the sender possesses. Transponders and beacons also require a second transmission system for both sender and receiver. However, 1) such devices may be able to transmit information more rapidly than voice radio, and may do so automatically; and 2) it is good design practice to use dissimilar redundant systems for critical functions. For these reasons, a voice radio system would complement rather than replace existing emergency notification systems.

SUMMARY

A voice radio communication system in accordance with one embodiment transmits and receives messages based on priority; lower priority messages are not dropped but are recorded for later playback; this may include analog-to-digital conversion, compression, and storage. In addition, any message (including real-time transmissions) can be paused during receipt in order to attend to other tasks. Benefits are 1) priority information, such as an emergency message, gets priority of transmission; 2) message loss (due to being missed by the recipient, forgotten by the recipient, or stepped on during transmission) is prevented; and 3) workload bottlenecks for multi-tasking recipients are alleviated. These benefits can result in improved mission effectiveness and survivability in military applications, and improved margin of safety in commercial aircraft applications.

DETAILED DESCRIPTION

Figure 1:
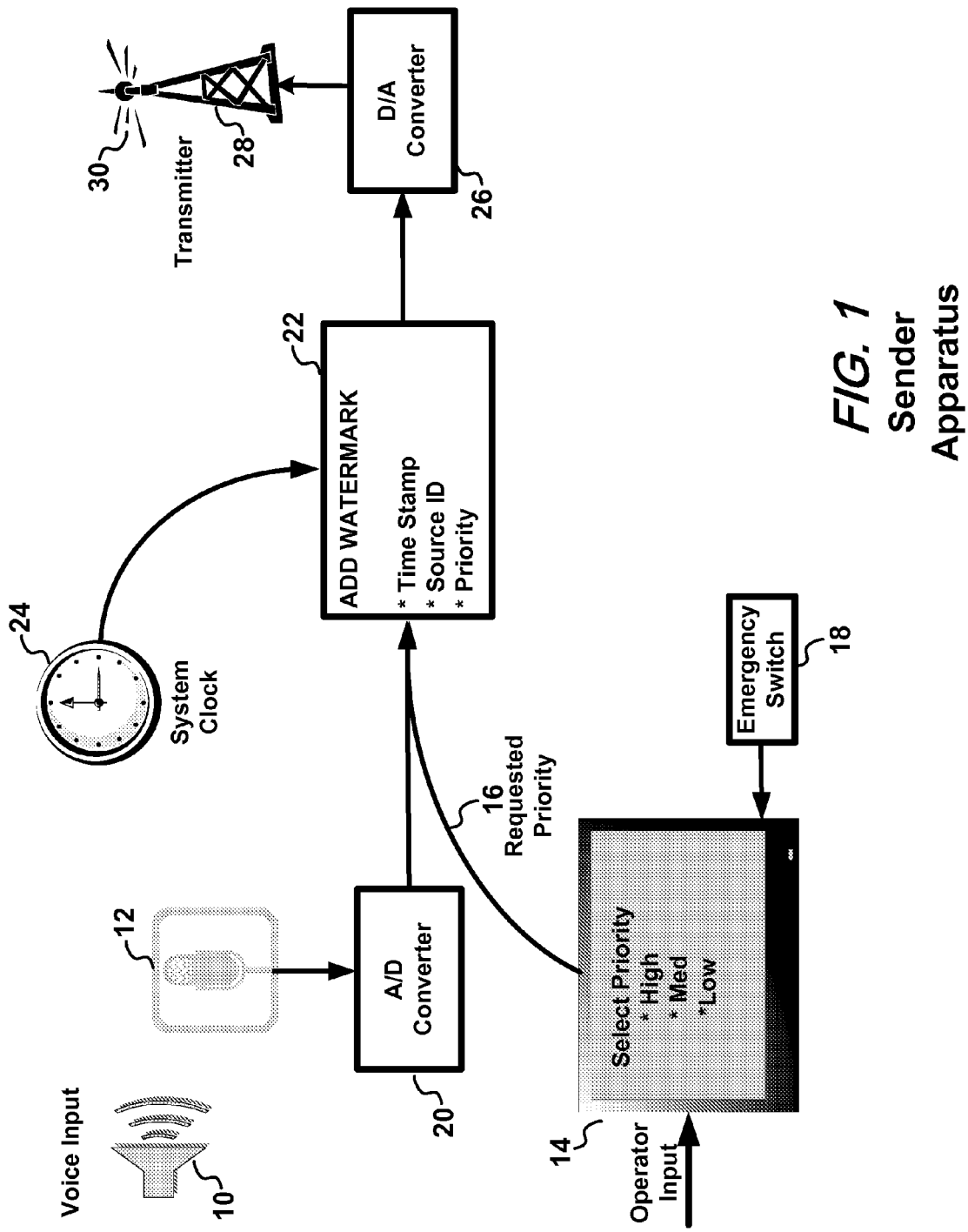
FIG. 1 is a schematic illustration of the transmitter side of a communication system in accordance with one embodiment.

FIG. 1 is a representation of the sender's part of an apparatus in accordance with one embodiment. Starting from the left, the message sender creates a voice input 10, for example by speaking into a microphone 12. In addition, the sender may provide input of a requested priority 16 to a processor in the form of a computer 14. The input processor is shown as a computer 14 with a separate monitor and keyboard for illustration purposes, but many types of processors may fulfill this function. This input processor may be standalone or integrated into the microphone 12. The input processor may contain a hardware emergency switch 18 that may be activated in an emergency. For some applications, this switch 18 may be toggled and left in the "on" position to activate an emergency beacon.

The incoming message is passed through an analog to digital converter 20, which may be part of an existing radio system. The message and the requested priority then become inputs to software 22 in the computer 14. The software 22, which may be an add on to existing software, puts into the message a digital watermark containing a time stamp from system clock 24, a source identification, and a designation of a user requested priority.

The resulting voice signal containing the digital watermark is converted into an analog signal in digital to analog converter 26 and then sent out to a recipient by a transmitter 28 which emits transmitted message 30. The particular method by which the watermarked voice signal is sent to a recipient is not critical. Any method may be used including digital transmission without the digital to analog converter 26.

Figure 2:
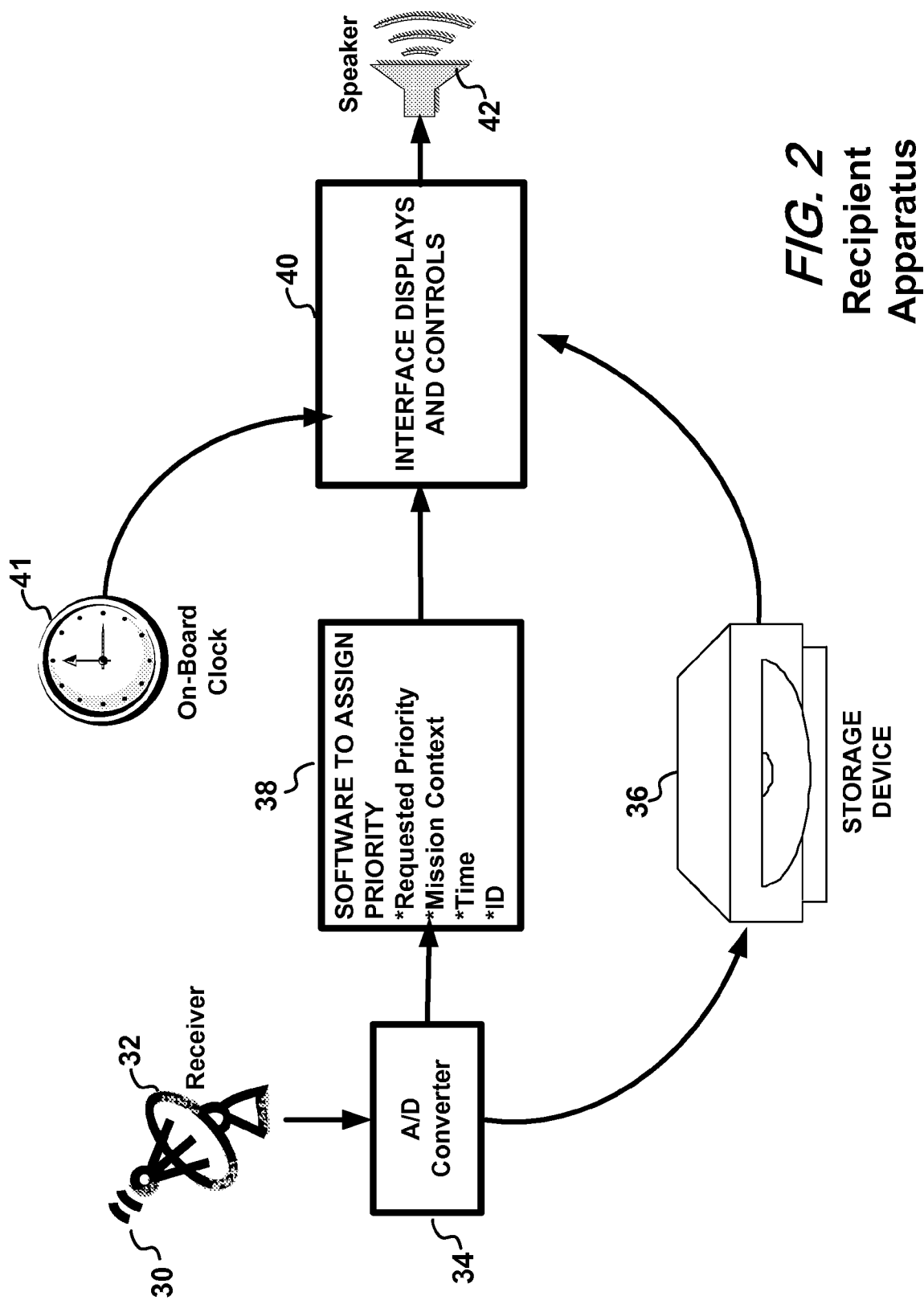
FIG. 2 is a schematic diagram of the receiver side of a communication system in accordance with one embodiment.

FIG. 2 is a diagram of the recipient's part of an apparatus in accordance with one embodiment of the invention. The message 30 is received by a receiver 32 and converted to digital form by an analog to digital converter 34. The message 30 is stored in this form on a storage device 36, and is simultaneously input to software 38 in the storage device 36. The software 38 assigns a priority to the message by decoding the watermark to get requested priority, time, and source ID; mission context is also considered. Once priority is assigned, the message it is made available for visual display by a user interface 40 and for audible play by a speaker 42.

Figure 3:
FIG. 3 shows an illustrative user interface in accordance with one embodiment.

FIG. 3 shows an example of a user interface for the message recipient. The user interface 40 is responsive to an onboard clock 41 to show current time. A set of recent messages is displayed. In this case, the messages are sorted based on priority, but may be sorted based on any of the columns shown. Once a message is selected by the recipient, it can be played, paused, rewound, and replayed. The user interface shown in FIG. 3 is not the only interface that is possible. More sophisticated displays and controls are possible.

Implementation may involve modification of existing radio voice communication systems. Incoming messages may be assigned priorities based on urgency, identity of the sender, and other characteristics. These priorities may be assigned a priori by the user (e.g., a pilot) or by other authority (e.g., Air Traffic Management, Higher Headquarters). Messages may be automatically presented in order of priority. Alternately, the recipient can manually select whether to hear a message immediately or to defer for later. The recipient can also pause a message as it comes in and then resume or replay it at any time.

The functionality described herein can be achieved by adding elements to both the transmitter and the receiver in existing communication systems. It may be used in digitally encoded radio systems, but also applies to legacy analog systems. There are four main additions to existing systems that may provide the required functionality:

(1) The transmitter inserts a digital watermark, an inaudible pattern of bits, in each message. The watermark contains a unique transmitter ID and a requested message priority level. The requested priority level may be a default value that the transmitter operator can override with a special control added for this purpose.

(2) The receiving system records each incoming message on digital media that allows for immediate retrieval. Using the storage media, the system is capable of time shifting messages. That is, incoming messages can be delayed before being presented to the recipient, can be paused during presentation, can be restarted before the presentation has been completed, and/or can be repeated in part or in full immediately. During storage the system associates each message with the time of receipt, source transmitter ID, and requested priority level. Time of receipt may be obtained from the receiver system's clock. The other data may be obtained from the message's watermark.

(3) Software in the receiver system uses the source ID to look up pertinent information about the sender. The software then assigns priorities to messages based on time of receipt, sender, requested priority, and mission context. For example, if the system is used onboard a military aircraft in the context of cruise flight, message priority might be assigned based on the sender's rank. In the context of the takeoff and landing phase, messages from air traffic control receive highest priority. For a Coast Guard aircraft conducting a search, a sender-requested "emergency" level may increase the priority of messages from a vessel in distress. Because of the wide range of possible applications, software algorithms may be user selectable to provide flexibility in the method of assigning priorities.

(4) The receiver system includes a user interface display and associated controls. The system displays a list of messages with their associated time stamp, sender, priority, and other relevant information. Controls allow the recipient to select messages for presentation or deferral, including pause, resume, restart, and replay features. The display and user interface may be visual, auditory, or both. Control inputs may be in various forms, including touch screen, speech recognition, or traditional buttons and knobs.

The system accommodates a wide range of potential applications and user preferences by offering a number of options in its operation. One option is full manual mode. In this case, the user interface lists messages in order of time received. The system functions just like current "party line" radio communications with three exceptions: First, the recipient has access to time shifting features such as real-time pause and instant replay; second, stepped-on messages are recorded for later playback; and third, the sender is identified on the recipient's display.

At a higher level of automation, the messages can be queued and displayed in order of priority. The highest priority message may play automatically. The recipient retains the ability to start, pause, and replay any message. The user interface indicates whether a message has been presented at least once. Optionally, the system will warn the operator if any message has been neglected for an extended period of time, the length of the period depending on message priority and whether this priority or watermark includes information that a response may be time sensitive (e.g., a clearance from air traffic management).

Another option automatically interrupts a currently playing message if a higher priority message comes in. If integrated with an airplane warning, caution, and advisory (WCA) system, auditory warnings from the WCA system (e.g., "Terrain, Terrain", "Windshear") may automatically pause any incoming communication for the duration of the warning. Another option has the recipient's system automatically transmit "Wait one" to any sender whose message was queued by automation or is being manually paused.

As mentioned above, communication systems having the functionality described herein prevent messages from being stepped on. The recipient can hear and respond to all messages, even those transmitted simultaneously, by recording all messages, particularly the lower priority messages, for later playback. Emergency messages may never be missed, and they receive the highest priority even when on-board auditory warnings activate.

The recipient may defer communications during periods of high workload, freeing resources to attend to other tasks without adding a memory task. This can be done using the "pause" feature, attending to another task, and then resuming the incoming message at the point of interruption. It can also be done automatically by simply ignoring incoming transmissions. The messages will be recorded and displayed for later playback. The automatic recording feature ensures that messages may never be lost due to attention tunneling.

Most of the components needed to build a working version of a communication system described herein are available off the shelf today. The radio system itself may be an existing design. Digital watermarking technology, quick-retrieval digital storage devices (such as TIVO devices), and appropriate displays and controls are available from many commercial sources.

There are many applications to which the principles described herein may be applied. For example, if the application were to civilian marine radios, it might be desired to add a protected switch on the transmitter to request "emergency" priority. The "emergency" watermark may then be recognized by such radios on other vessels and by the Coast Guard. Another example is an application where one expects to communicate with legacy systems that lack the ability to watermark. Priorities may then be difficult to determine, so the design might be modified to use recipient-assigned priorities or to restrict automated deferral of messages.

The Title, Technical Field, Background, Summary, Brief Description of the Drawings, Detailed Description, and Abstract are meant to illustrate the preferred embodiments of the invention and are not in any way intended to limit the scope of the invention. The scope of the invention is solely defined and limited by the claims set forth below.

The invention claimed is:

1. A method for presenting multiple voice radio transmissions, the method comprising:
   receiving a plurality of voice radio transmissions at a radio receiver;
   digitally recording said plurality of voice radio transmissions at the radio receiver;
   decoding one or more watermarks embedded in said plurality of voice radio transmissions received at the radio receiver to determine a sender identification and a sender-defined priority for each of said plurality of voice radio transmissions; and
   presenting each of said plurality of voice radio transmissions automatically, in real-time, based on the priority of each voice radio transmission;
   wherein said priority of the voice radio transmission is based in part on in-flight operational conditions of an aircraft including cruise, takeoff, and landing conditions.

2. The method of claim 1 wherein presenting each of said plurality of voice radio transmissions comprises presenting an audible transmission.

3. The method of claim 1 wherein presenting each of said plurality of voice radio transmissions comprises presentation of a text display representative of the voice transmission.

4. The method of claim 1 further comprising manually selecting one of said plurality of voice radio transmissions.

5. The method of claim 1 wherein receiving a plurality of voice radio transmissions comprises receiving a first voice radio transmission of said plurality of voice radio transmissions that overlaps in time with receiving a second voice radio transmission.

6. A method of performing voice radio communications with an aircraft, comprising the steps of:
   receiving, in a receiver in the aircraft, a plurality of voice messages;
   decoding one or more digital watermarks embedded in the plurality of voice messages;
   assigning a priority level to the plurality of voice messages based on sender-defined priority information in the watermark and in-flight operational conditions on the aircraft;
   displaying automatically, in real-time based on the priority of the plurality of voice messages, information about the voice communication to a user;
   wherein the in-flight operational conditions of the aircraft include cruise, takeoff, and landing conditions.

7. The method of claim 6, further comprising recording the voice communication.

8. The method of claim 6, in which the information in the watermark comprises source identification.

9. The method of claim 6, in which the information in the watermark comprises a user requested priority.

10. The method of claim 6, in which the information in the watermark comprises a time stamp.

11. The method of claim 6, in which the priority level is low, medium, high, or emergency.

12. The method of claim 6, in which displaying step comprises displaying one or more of a time stamp, a source identification, a priority level, and a designation of whether the message has been played by a user.

13. The method of claim 7, further comprising the step of playing back the recorded voice communication.

14. The method of claim 13, further comprising the step of: pausing playback of the recorded voice communication.

15. The method of claim 13, further comprising the step of: rewinding the recorded voice communication.

* * * * *